United States Patent
Sunesson et al.

(10) Patent No.: US 8,726,728 B2
(45) Date of Patent: May 20, 2014

(54) LEVEL GAUGE SYSTEM WITH WETTABLE PROPAGATION DEVICE

(75) Inventors: Mattis Sunesson, Göteborg (SE); Linus Eklund, Göteborg (SE)

(73) Assignee: Rosemount Tank Radar AB, Gothenburg (SE)

( * ) Notice: Subject to any disclaimer, the term of this patent is extended or adjusted under 35 U.S.C. 154(b) by 51 days.

(21) Appl. No.: 13/418,776

(22) Filed: Mar. 13, 2012

(65) Prior Publication Data

US 2013/0239676 A1 Sep. 19, 2013

(51) Int. Cl.
*G01F 23/28* (2006.01)
*G01F 23/00* (2006.01)

(52) U.S. Cl.
USPC ........................................ 73/290 V; 73/290 R

(58) Field of Classification Search
USPC ...... 73/290 R, 290, 1.73, 578, 290 V; 29/595, 29/619, 758
See application file for complete search history.

(56) References Cited

U.S. PATENT DOCUMENTS

| | | | |
|---|---|---|---|
| 5,889,073 A * | 3/1999 | Zhang et al. ...................... 522/3 |
| 6,435,025 B1 * | 8/2002 | Krause ......................... 73/304 C |
| 6,904,821 B2 * | 6/2005 | Lenk ............................... 73/866.5 |
| 6,950,055 B2 * | 9/2005 | Edvardsson et al. ........... 342/124 |
| 7,131,325 B2 * | 11/2006 | Nilsson et al. ............... 73/290 V |
| 7,586,435 B1 * | 9/2009 | Edvardsson ................... 342/124 |
| 7,707,881 B2 * | 5/2010 | Jacob et al. .................. 73/290 R |
| 7,800,528 B2 * | 9/2010 | Nilsson et al. ................. 342/124 |
| 7,855,676 B2 * | 12/2010 | Ohlsson et al. ............... 342/124 |
| 8,009,085 B2 * | 8/2011 | Kuhlow et al. ............... 342/173 |
| 8,350,751 B2 * | 1/2013 | Edvardsson et al. .......... 342/124 |
| 2002/0124644 A1 * | 9/2002 | Lubbers ....................... 73/290 R |
| 2004/0011126 A1 * | 1/2004 | Otto et al. .................... 73/290 R |
| 2004/0119635 A1 * | 6/2004 | Edvardsson .................. 342/124 |
| 2004/0149029 A1 * | 8/2004 | Watson ........................ 73/290 R |
| 2007/0101809 A1 * | 5/2007 | Roesner ....................... 73/290 R |
| 2009/0071245 A1 * | 3/2009 | Harazin et al. .............. 73/290 R |

(Continued)

FOREIGN PATENT DOCUMENTS

| | | |
|---|---|---|
| DE | 10 2007 059 758 A1 | 6/2009 |
| EP | 0 869 156 B1 | 7/1997 |
| JP | 10-51214 | 2/1998 |

OTHER PUBLICATIONS

"Titanium Dioxide Photocatalysis", by A. Fujishima et al., *Journal of Photochemistry and Photobiology C: Photochemistry Reviews*, 2000, pp. 1-21.

*Primary Examiner* — Peter Macchiarolo
*Assistant Examiner* — Mohammed Keramet-Amircolai
(74) *Attorney, Agent, or Firm* — Westman, Champlin & Koehler, P.A.

(57) ABSTRACT

The present invention relates to a level gauge system for determining a filling level of a product contained in a tank, comprising a transceiver for generating, transmitting and receiving electromagnetic signals; a signal propagating device connected to the transceiver and arranged to propagate a transmitted electromagnetic signal along a generally vertical path towards a surface of the product inside the tank, and to return a surface echo signal resulting from reflection of the transmitted electromagnetic signal at the surface of the product contained in the tank; and processing circuitry connected to the transceiver and configured to determine the filling level based on the surface echo signal. A surface of the signal propagating device comprises a surface portion that exhibits a wettability defined by a contact angle between the surface portion and water being less than 30°.

15 Claims, 2 Drawing Sheets

(56) References Cited

U.S. PATENT DOCUMENTS

| | | | |
|---|---|---|---|
| 2010/0070209 A1* | 3/2010 | Sai | 702/55 |
| 2010/0103024 A1* | 4/2010 | Schultheiss et al. | 342/124 |
| 2010/0215511 A1* | 8/2010 | Eller et al. | 417/44.1 |
| 2012/0067268 A1* | 3/2012 | Guerrero et al. | 114/321 |
| 2012/0096938 A1* | 4/2012 | Edwards | 73/290 R |
| 2012/0167660 A1* | 7/2012 | Calcote | 73/1.73 |
| 2012/0262331 A1* | 10/2012 | Kienzle et al. | 342/124 |
| 2012/0324994 A1* | 12/2012 | Welle et al. | 73/290 V |

\* cited by examiner

LEVEL GAUGE SYSTEM WITH WETTABLE PROPAGATION DEVICE

FIELD OF THE INVENTION

The present invention relates to a level gauge system using electromagnetic waves for determining the distance to a surface of a product contained in a tank. In particular, the present invention relates to a propagation device for such a radar level gauge system.

TECHNICAL BACKGROUND

Field devices, such as radar level gauges, are suitably used for measuring the level of products such as process liquids, granular compounds and other materials. An example of such a radar level gauge can include a microwave unit for transmitting microwaves towards the surface and receiving microwaves reflected by the surface, processing circuitry arranged to communicate with the microwave unit and to determine the level based on a relation between transmitted and received microwaves, an interface for connecting said processing circuitry externally of the radar level gauge, and a power management circuitry providing the microwave unit and the processing circuitry with operating power.

More particularly, the distance to the surface of the product is generally determined based on the time between transmission of an electromagnetic signal and reception of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity of the electromagnetic signals.

In order to accurately determine the time-of-flight of the electromagnetic signals, the received signals must have sufficient amplitude or power so that they can be detected and analyzed. Hence, it is important that propagation losses are kept to a minimum. Propagation losses can for example be the result of scattering or damping of the signal, both leading to a reduction in power of the signal reaching the receiver/transceiver. Propagation losses may occur both for transmission line probes, waveguide structures and radiating antennas.

Contaminating materials adhering to an antenna may cause scattering of the signal as the geometry of the antenna is altered. The adherence of contaminants on an antenna may also lead to damping of the signal in the case that the signal has to propagate through contaminating material on the antenna.

Addressing the problem of contamination is particularly relevant in tanks for storage of petroleum products which may easily stick to the surface of the antenna, thereby leading to a deterioration of signal quality.

An attempt to solve the abovementioned problem of contamination is disclosed by U.S. Pat. No. 7,707,881 relating to a fill level sensor with an antenna having an anti-adhesive coating. An objective of U.S. Pat. No. 7,707,881 is to achieve a non-wettable and self cleaning surface preventing any materials from sticking to the surface of the antenna. According to U.S. Pat. No. 7,707,881, this objective may be is achieved by forming a microsmooth surface having anti-adhesive surface properties.

In particular for some combinations of tank content and environmental conditions, however, it has turned out that anti-adhesive coatings such as that described in U.S. Pat. No. 7,707,881 are not capable of preventing adhesion of tank content to the antenna, resulting in loss of performance.

SUMMARY OF THE INVENTION

In view of the above-mentioned and other problems, a general object of the present invention is to provide an improved level gauge system, and in particular to provide a level gauge system capable of maintaining its level gauging performance even in difficult conditions in terms of contamination.

According to a first aspect of the present invention, these and other objects are achieved through a level gauge system for determining a filling level of a product contained in a tank, the level gauge system comprising: a transceiver for generating, transmitting and receiving electromagnetic signals; a signal propagating device connected to the transceiver, the signal propagating device comprising a signal directing portion arranged and configured to direct a transmitted electromagnetic signal along a generally vertical path towards a surface of the product inside the tank, and to return a surface echo signal resulting from reflection of the transmitted electromagnetic signal at the surface of the product contained in the tank; and processing circuitry connected to the transceiver and configured to determine the filling level based on the surface echo signal; wherein a surface of the signal directing portion comprises a surface portion that exhibits a wettability defined by a contact angle between the surface portion and water being less than 30°.

The definition of "wettability" used in the context of the present application refers to the static contact angle. The contact angle can be said to be static when the drop is neither advancing nor receding. As is known to those skilled in the art, the static contact angle of a surface may be determined by arranging a drop of water on top of a horizontal surface, taking a profile picture of at least the interface between the drop and the surface and analyzing the contour of the drop. This type of contact angle measurement is known as the sessile drop technique.

The surface tension between a liquid and a solid determines the angle at which the liquid contacts the surface. The angle is known as the wetting angle, or the contact angle, of a liquid to a solid. Accordingly, wettability may be seen a measure of the ability of a specific liquid to adhere to a particular surface, where a higher wettability means that a liquid more easily adheres to a surface.

The signal directing portion is a portion of the signal propagating device that is operational to direct the transmitted signal towards the surface of the product contained in the tank, when the level gauge system is in use. For a radiating antenna, the signal directing portion is the portion of the antenna that directs the transmission signal towards the surface of the product in the tank, either through direct emission as may be the case for an array antenna, or through reflection as may be the case for a parabolic antenna. In the latter case, for example, the signal directing portion is the concave side directed towards the surface of the product in the tank, and the surface portion that exhibits the specified wettability faces the product in the tank.

Furthermore, the signal directing portion may advantageously be electrically conductive, for example metallic, but may also be partly dielectric.

The level gauge system according to various embodiments of the present invention may be useful for determining the filling level of a product contained in any kind of tank. Due to the difficult surface contamination conditions occurring during the transportation at sea of petroleum products, it is anticipated that the level gauge system according to various embodiments of the present invention will be particularly useful for embodiments where the level gauge system is installed to determine the filling level of a tank onboard a vessel.

It should be noted that any one or several of the means comprised in the processing circuitry may be provided as either of a separate physical component, separate hardware blocks within a single component, or software executed by one or several microprocessors.

When analyzing the interaction between different surfaces and certain petroleum products under conditions such as those that may sometimes prevail during transportation of petroleum products at sea, for example transportation of crude oil at sea during cold weather and rough sea, the inventors have found that anti-adhesive coatings are not effective for preventing adhesion of tank content to the antenna. Furthermore, the present inventors have found that temperature is a crucial factor, and that, for example, crude oil tends to solidify on a surface as drops at low ambient temperatures (such as below 10° C.) even when the surface is highly repellent at room temperature.

The present inventors have further surprisingly found that drops of petroleum products, such as crude oil, can easily and completely roll off from a surface that is covered by a thin film of water. This is believed to be due to the liquid-liquid interaction thus obtained.

It is well known that water on the antenna may disturb measurements using microwaves, the present inventors have, however, found that if the propagation device of the level gauge system at least partly exhibits a high wettability and the propagation device is arranged in a tank atmosphere containing water vapor, a thin water film will form on the coated portion of the surface, which film is capable of achieving the above-described roll-off of the petroleum product, while being sufficiently thin not to significantly disturb the microwave-based filling level measurement.

A sufficiently high wettability for the desired formation of a thin water film has been found to correspond to a contact angle between the surface portion and water being less than 30°. An even smaller contact angle, such as less than 20° provides an even further improved result and more rapid formation of a thin and continuous water film which may improve further improve the performance of the level gauge system and/or allow use thereof in even more challenging fields of application. An even further reduction of the contact angle to below 10° is expected to result in a further improvement.

In the presence of water, a water film will be formed on the wettable surface and that water film helps to prevent contaminants from adhering to the surface. In particular, as petroleum products are hydrophobic, i.e. they naturally repel water, they do not easily adhere to a water covered surface.

Accordingly, various embodiments of the present invention provide for a level gauge system with improved signal propagating properties as contaminants in general and petroleum products in particular are hindered from adhering to the surface of the signal propagating device, thereby reducing the risk of damping and scattering of the signal resulting from contaminants.

In order to achieve the desired water film that promotes roll-off of petroleum product, while at the same time allowing transmission and reception of microwaves with sufficiently low loss, it has been found to be advantageous if the surface portion has such a properties that condensation takes place evenly so that, at least on a macroscopic scale, no isolated water droplets are formed. By "isolated water droplets" should be understood water droplets that are surrounded by an area that is not covered by a water film. With an increasing thickness of the water film, droplets may form even if condensation was initiated as a substantially uniform water film. However, such water droplets will not be isolated water droplets, but will be joined by thinner portions of the water film.

The present inventors have found that such evenly occurring condensation can be achieved by coating the surface portion.

The surface portion may be coated with any coating providing the desired surface properties, that is, a contact angle between the surface portion and water being less than 30°.

According to one embodiment, the coating may comprise titanium dioxide. It is expected that other coatings with similar properties can be devised. For example, some other metal oxides, hydrophilic polymers, silicon oxides or ceramic materials may also result in evenly occurring condensation. Whether or not condensation takes place evenly for a particular coating can be determined by those skilled in the art through simple experiments and ocular inspection.

In addition to providing the desired evenly occurring condensation, titanium dioxide, $TiO_2$: may be easily deposited using known methods such as sputtering or evaporation. Alternatively, a coating material comprising $TiO_2$ particles may be used. Moreover, as $TiO_2$ is a relatively hard material, it is not overly sensitive to wear and scratching.

In one embodiment of the invention, the above-mentioned coated surface portion may advantageously constitute at least one half of the surface of the signal directing portion of the signal propagating device. It may not be required that the entire surface of the signal directing portion of the signal propagating device is wettable. In some applications, it may be sufficient to form a wettable surface on selected portions of the signal directing portion, for example where the signal intensity is particularly high or at positions where the signal is sensitive to disturbances.

In one embodiment of the invention, the signal propagating device may advantageously be a parabolic antenna comprising a parabolic reflector having a concave signal propagating surface. This concave signal propagating surface may comprise the above-mentioned surface portion exhibiting a wettability defined by a contact angle between the surface portion and water being less than 30°.

In a parabolic antenna, a signal to be transmitted towards the surface of the product is provided by a feeder emitting a signal towards the concave surface of the reflector where the signal is reflected and directed towards the product. The concave surface of the reflector may thus be seen as a signal directing surface. Contaminants on the reflector may dampen or scatter both the signal transmitted by the feeder and the subsequently received surface echo signal. Accordingly, it is desirable to reduce the amount of contaminants adhering to the reflector in the parabolic antenna, which may be achieved by providing for the formation of a water film on at least a portion of the signal directing surface as described above.

According to one embodiment of the invention, the signal propagating device may be a horn antenna. As a horn antenna is a radiating antenna, it shares the aforementioned advantages related to the radiating parabolic antenna.

Furthermore, more than half of a signal directing surface of the horn antenna may advantageously have the aforementioned wettable surface properties. The signal directing surface of a horn antenna where it is particularly desirable to avoid the adherence of contaminants may be seen as the inner surface of the tubular horn structure.

In one embodiment of the invention, the signal propagating device may be a rod antenna.

In one embodiment of the invention, the signal propagating device may be a probe. Different types of probes or include, but are not limited to, single conductor probes, multi conductor probes, coaxial conductor probes or and flexible cable conductor probes. Moreover, a waveguide structure such as a still pipe may also be used.

As the level of the product is varying, it may be advantageous for the entire surface of a probe to have wettable properties.

In one embodiment of the invention, the surface portion may advantageously comprise structures for hindering water adhering to the surface portion from running off the surface portion. It is desirable that water adhered to the surface portion remains there. Accordingly, surface structures may be incorporated in the surface of the propagating device hindering or preventing water adhered to the surface from leaving the surface.

Furthermore, the structures may advantageously comprise horizontally arranged ridges. Structures such as ridges arranged horizontally, extending in a circumferential direction of the propagating device, may hinder water from leaving the surface. However, other types of structures such as grooves or a microstructured surface may be used to the same effect.

Moreover, the level gauge system according to various embodiments of the present invention may advantageously be comprised in a vessel for transporting a petroleum product, the vessel further comprising a tank arranged to contain the petroleum product, wherein the level gauge system is attached to the tank in such a way that at least the surface portion of the propagating device, exhibiting the wettability defined by a contact angle between the surface portion and water being less than 30°, is arranged to be directed towards the petroleum product inside the tank.

According to a second aspect of the present invention, it is provided a method of determining a filling level of a product contained in a tank, comprising the steps of providing a level gauge system comprising a propagation device having a surface portion, the surface portion exhibiting a wettability defined by a contact angle between the surface portion and water being less than 30°; and arranging the level gauge system at a closed tank, such that at least the surface portion of the propagating device is subjected to a tank atmosphere containing water vapor such that the water vapor condensates as liquid water on at least the surface portion of the propagating device, thereby forming a water film on the coated surface portion.

To increase the condensation rate and thereby promote the formation of a water film on the surface portion of the propagating device, the product may advantageously be heated.

Further embodiments of, and effects obtained through this second aspect of the present invention are largely analogous to those described above for the first aspect of the invention.

BRIEF DESCRIPTION OF THE DRAWINGS

These and other aspects of the present invention will now be described in more detail, with reference to the appended drawings showing an exemplary embodiment of the invention, wherein.

DETAILED DESCRIPTION OF EXAMPLE EMBODIMENTS OF THE INVENTION

Figure 1:
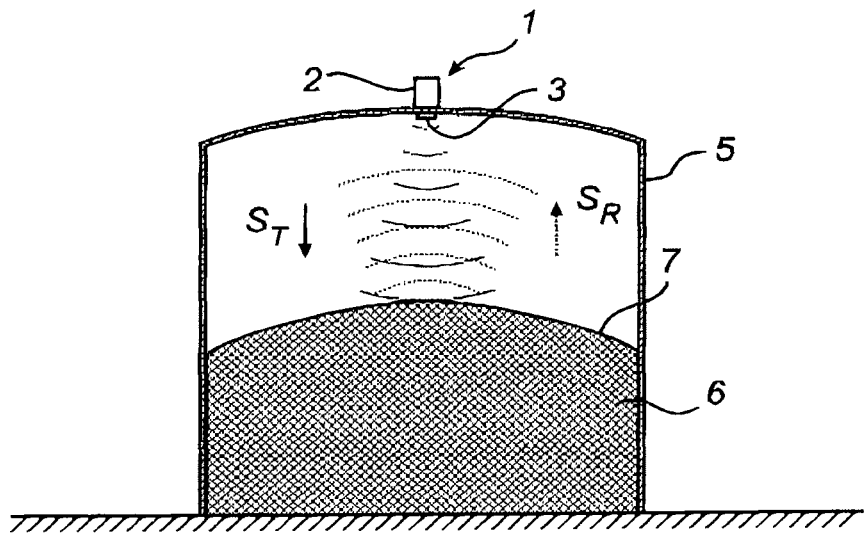
FIG. 1 schematically illustrates a level gauge system according to an embodiment of the present invention installed in an exemplary tank.

FIG. 1 schematically illustrates a level gauge system 1 according to an embodiment of the present invention, comprising a measurement electronics unit 2, and a propagation device in the form of a radiating antenna device 3. The radar level gauge system 1 is provided on a tank 5, which is partly filled with a product 6 to be gauged. In the case illustrated in FIG. 1, the product 6 is a liquid, such as a petroleum-based product. Specifically, the product is Vacuum Gas oil, VGO. By analyzing a transmission signal $S_T$ being radiated by the antenna device 3 towards the surface 7 of the product 6, and a reflected signal $S_R$ traveling back from the surface 7, the measurement electronics unit 2 can determine the distance between a reference position and the surface 7 of the product 6, whereby the filling level can be deduced. It should be noted that, although a tank 5 containing a single product 6 is discussed herein, the distance to any material interface present in the tank 5 can be measured in a similar manner depending on the propagation properties of the materials.

Figure 2:
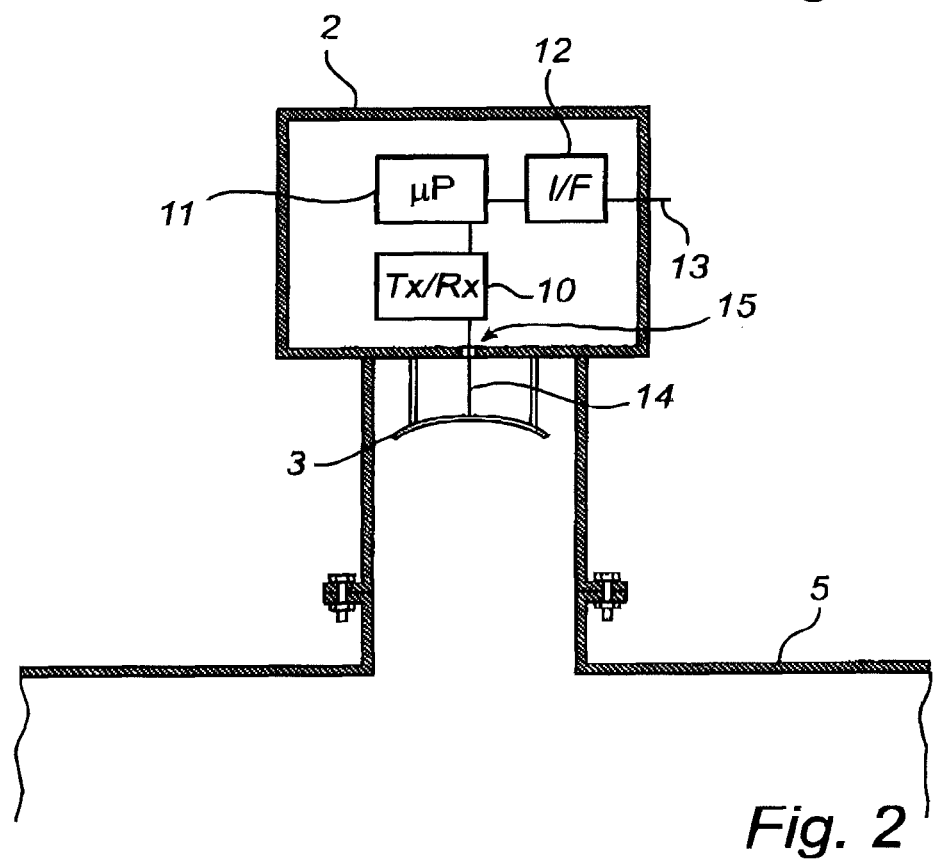
FIG. 2 is a schematic illustration of the measurement electronics unit comprised in the level gauge system in FIG. 1.

As is schematically illustrated in FIG. 2, the electronics unit 2 comprises a transceiver 10 for transmitting and receiving electromagnetic signals, a processing unit 11, which is connected to the transceiver 10 for control of the transceiver and processing of signals received by the transceiver to determine the filling level of the product 6 in the tank 5.

The processing unit 11 is, furthermore, connectable to external communication lines 13 for analog and/or digital communication via an interface 12. Moreover, although not shown in FIG. 2, the radar level gauge system 1 is typically connectable to an external power source, or may be powered through the external communication lines 13. Alternatively, the radar level gauge system 1 may be powered locally, and may be configured to communicate wirelessly.

Although being shown as separate blocks in FIG. 2, several of the transceiver 10, the processing circuitry 11 and the interface 12 may be provided on the same circuit board.

In FIG. 2, furthermore, the transceiver 10 is illustrated as being separated from the interior of the tank 5 and connected to the antenna device 3 via a conductor 14 passing through a feed-through 15 provided in the tank wall. It should be understood that this is not necessarily the case, and that at least the transceiver 10 may be provided in the interior of the tank 5.

Figure 3:
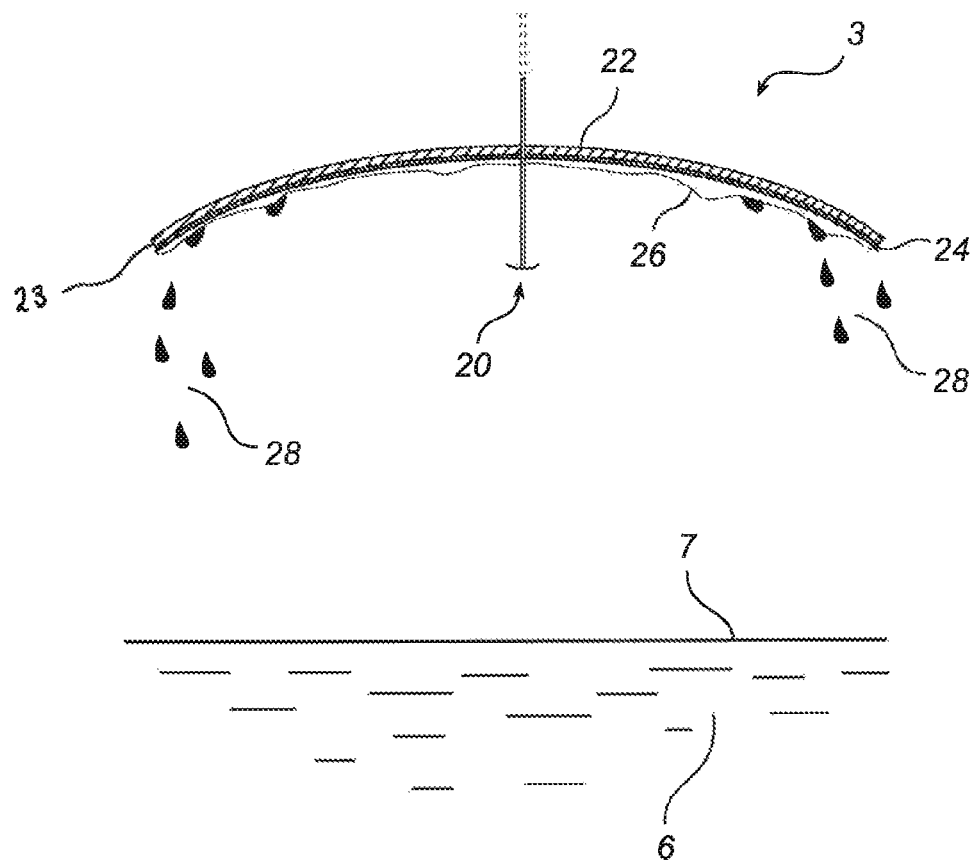
FIG. 3 illustrates an exemplary embodiment of a propagation device comprised in the level gauge system in FIG. 1.

FIG. 3 schematically illustrates the radiating antenna 3, here in the form of a parabolic antenna comprising an antenna feeder 20 and a conductive parabolic reflector 22. The parabolic antenna is arranged above the surface 7 of the product 6 contained in the tank. The concave surface 23 of the parabolic reflector has a coating layer 24 of $TiO_2$, which may be deposited using a conventional deposition method, such as for example evaporation or sputtering.

In FIG. 3 it is illustrated how a water film 26 is present on the surface of the $TiO_2$ coated reflector. It is further illustrated how drops 28 of oil, which have splashed onto the water film, which may for example occur during transportation at sea, slide to the edge of the reflector where they fall off.

As the attractive forces between water and a petroleum product are low, the oil drops will fall off the reflector, either directly or by sliding, following the curvature of the reflector to the edge.

The surface may also be provided with surface structures for hindering water adhering to the surface from running off the surface. The surface structures may for example be circular ridges or grooves arranged to extend partially or entirely around the circumference of the propagating device. Depending on the type of propagation device, the surface structures may have to be designed differently in order to not adversely affect the electrical properties of the propagating device while still achieving the desired properties of hindering water from leaving the surface.

It is noted that the invention has mainly been described above with reference to a few embodiments. However, as is readily appreciated by a person skilled in the art, other embodiments than the ones disclosed above are equally possible within the scope of the invention, as defined by the appended claims. For example, the inventive concept may also be applicable for waveguide type antennas which may or may not be in direct contact with the product to be measured.

It is further noted that, in the claims, the word "comprising" does not exclude other elements or steps, and the indefinite article "a" or "an" does not exclude a plurality. A single apparatus or other unit may fulfill the functions of several items recited in the claims. The mere fact that certain measures are recited in mutually different dependent claims does not indicate that a combination of these measured cannot be used to advantage

EXPERIMENT

In an experiment, a steel plate was coated through sputtering by a 50 nanometer thick layer of $TiO_2$. The thus coated steel plate was arranged with the coating facing downwards above a beaker of water, which was heated to 80° C. Under these conditions, a continuous water film was formed on the coated surface in less than 5 minutes.

Subsequently, VGO (Vacuum Gas Oil) heated to 65° C. was dripped onto the water film, and the steel plate was then tilted. The drops of VGO exhibited good mobility and could be made to completely roll off from the surface through tilting.

The wettability of the $TiO_2$ coating was evaluated by measuring the static contact angle using the sessile drop technique. A drop having a drop volume of 1-5 µl was arranged on top of the horizontally arranged surface. The contact angle was determined to be approximately 15°.

What is claimed is:

1. A level gauge system for determining a filling level of a product contained in a tank, the level gauge system comprising:
   a transceiver for generating, transmitting and receiving electromagnetic signals;
   a signal propagating device connected to said transceiver, said signal propagating device comprising a signal directing portion arranged and configured to direct a transmitted electromagnetic signal along a generally vertical path towards a surface of said product inside the tank, and to return a surface echo signal resulting from reflection of the transmitted electromagnetic signal at said surface of the product contained in the tank; and
   processing circuitry connected to said transceiver and configured to determine said filling level based on said surface echo signal,
   wherein a surface of said signal directing portion comprises a surface portion that exhibits a wettability defined by a contact angle between said surface portion and water being less than 30°.

2. The level gauge system according to claim 1, wherein said contact angle is less than 20°, preferably less than 10°.

3. The level gauge system according to claim 1, wherein said surface portion is coated by a coating comprises titanium dioxide for providing said contact angle being less than 30°.

4. The level gauge system according to claim 1, wherein said surface portion constitutes at least one half of said surface of said signal directing portion of the signal propagating device.

5. The level gauge system according to claim 4, wherein said surface portion constitutes substantially a whole of said signal directing portion of the signal propagating device.

6. The level gauge system according to claim 1, wherein said signal propagating device is a parabolic antenna comprising a conductive parabolic reflector having a concave signal directing surface,
   wherein said concave signal directing surface comprises said surface portion.

7. The level gauge system according to claim 1, wherein said signal propagating device is a horn antenna comprising an inner signal directing surface,
   wherein said inner signal directing surface comprises said surface portion.

8. The level gauge system according to claim 1, wherein said signal propagating device is a probe arranged to extend into the product contained in the tank,
   wherein at least a portion of said probe arranged between said transceiver and a maximum filling level of said tank comprises said surface portion.

9. The level gauge system according to claim 1, wherein said surface portion comprises structures for hindering water adhered to said surface portion from leaving said surface portion.

10. The level gauge system according to claim 9, wherein said structures comprise horizontally arranged ridges.

11. The level gauge system according to claim 1, comprising a water film arranged across substantially all of said surface portion being subjected to a tank atmosphere inside said tank.

12. A vessel for transporting a petroleum product at sea, comprising:
    a floating tank arranged to contain said petroleum product; and
    a level gauge system comprising a signal propagation device having a signal directing portion comprising a surface portion, the surface portion exhibiting a wettability defined by a contact angle between said surface portion and water being less than 30°,
    wherein said level gauge system is attached to said tank in such a way that at least said surface portion of said signal directing portion of the signal propagating device is arranged to be directed towards said petroleum product inside the tank.

13. The vessel according to claim 12, comprising a water film arranged across substantially all of said surface portion being subjected to a tank atmosphere inside said tank.

14. A method of determining a filling level of a product contained in a tank, comprising the steps of:
    providing a level gauge system comprising a signal propagation device having a signal directing portion comprising a surface portion, the surface portion exhibiting a wettability defined by a contact angle between said surface portion and water being less than 30°; and
    arranging the level gauge system at a closed tank, such that at least said surface portion of said signal directing portion of the propagating device is subjected to a tank atmosphere inside said tank containing water vapor such that said water vapor condensates as liquid water on at least said surface portion of the signal directing portion, thereby forming a water film on said surface portion.

15. The method according to claim 14, further comprising the step of: heating said product.

* * * * *